No. 700,085. Patented May 13, 1902.
G. H. RADCLIFFE.
MICROMETER CALIPERS.
(Application filed Jan. 21, 1902.)
(No Model.)
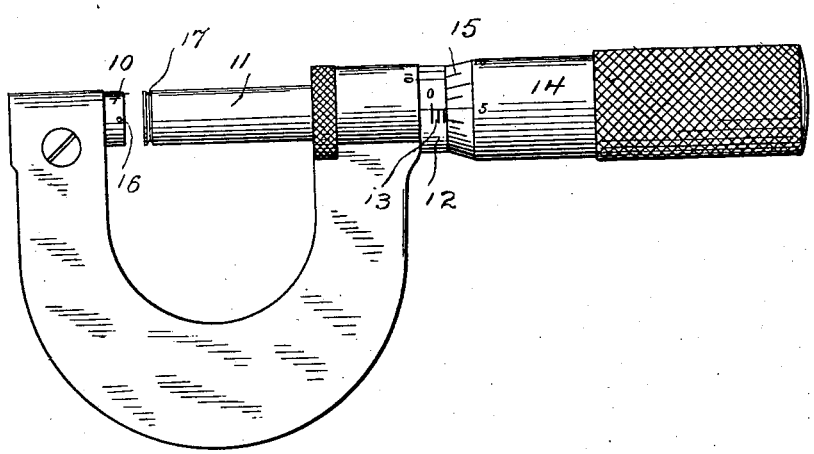
WITNESSES.
H. A. Lamb.
S. W. Atherton.
INVENTOR.
George H. Radcliffe
By A. M. Wooster
Atty.

UNITED STATES PATENT OFFICE.

GEORGE H. RADCLIFFE, OF DERBY, CONNECTICUT.

MICROMETER-CALIPERS.

SPECIFICATION forming part of Letters Patent No. 700,085, dated May 13, 1902.

Application filed January 21, 1902. Serial No. 90,669. (No model.)

*To all whom it may concern:*

Be it known that I, GEORGE H. RADCLIFFE, a citizen of the United States, residing at Derby, county of New Haven, State of Connecticut, have invented new and useful Micrometer-Calipers, of which the following is a specification.

My invention has for its object to provide micrometer-calipers with means for setting dividers and compasses with perfect accuracy in minute fractions—for example, thousandths of an inch. It is of course well understood by draftsmen and others having occasion to use dividers and compasses that although a caliper will measure the fractions of an inch as fine as may be required it is practically impossible to set a divider or compasses, as may be, with anything approaching an equal degree of accuracy, this for the reason that although the distance between the end of the spindle and the abutment of the caliper may be measured with perfect accuracy in thousandths of an inch human eyesight is not at its best perfect enough to insure adjustment of the divider or compass points at a distance apart exactly equal to the distance between the end of the spindle and the abutment. This difficulty I have wholly overcome by my novel invention and am enabled to provide micrometer-calipers by means of which a draftsman or other operator may adjust the points of compasses or dividers just as accurately as the caliper itself is capable of measuring minute fractions of an inch.

With the above-described end in view I have devised the novel improvement in micrometer-calipers, which I will now describe, referring to the accompanying drawing, forming part of this specification, and using reference characters to designate the several parts.

The figure of the drawing is an elevation of a micrometer-caliper with my novel improvement applied thereto.

10 denotes the abutment, and 11 the spindle by which minute fractions of an inch may be measured, the face of the abutment and the corresponding face of the spindle being parallel and perfectly smooth and the adjustment of the instrument being so fine that the thickness of fine tissue-paper will be indicated in thousandths of an inch.

I shall not describe the type of micrometer-caliper shown in the drawing in detail, for the reason that it is and has been for years in common use and specifically forms no portion of my present invention. It is sufficient for the purposes of this specification to state that the concealed portion of the spindle is provided with a screw, ordinarily having a pitch of forty to the inch, which moves in a corresponding internal thread in the hub 12. The hub is provided with a scale 13, graduated to indicate each turn of the spindle, so that the movement of sleeve 14 backward on the hub and the corresponding movement of the end of the spindle away from the abutment will be indicated by scale 13, each mark upon the scale indicating twenty-five thousandths of an inch. The edge of the sleeve, which acts in connection with the scale 13, is beveled and is provided with a scale 15, divided into twenty-five parts, so that each division of scale 15 will indicate one one-thousandths of an inch.

My invention consists in providing the abutment and the end of the spindle with means for accurately setting the compass or divider points at any required distance apart. With this end in view I provide the abutment with a depression 16, the bottom of which shall be an exact fraction of an inch, preferably twenty-five thousandths, from the outer face of the abutment, and provide the spindle near its end with a circumferential groove 17, the bottom of which shall be the exact distance from the face of the spindle that the bottom of depression 16 is from the face of the abutment. As already stated, I preferably make this distance from the bottom of the depression and the groove to the face of the abutment and spindle, respectively, twenty-five thousandths of an inch. This special fraction of an inch, however, although a convenient one, is not an essential feature of my invention.

The operation is as follows: The least distance apart at which the points of compasses or dividers may be set is fifty thousandths of an inch. This adjustment may be obtained by rotating the sleeve and placing the face of the spindle lightly in contact with the face of the abutment. The bottom of the depression and the bottom of the groove will then be just fifty thousandths of an inch apart, and compasses or dividers may be set to that adjustment by placing their respective points in engagement with the bottoms of the depression and the recess, which are of course so shaped as to receive the points of compasses or dividers and retain them against movement. The adjustment of the micrometer-caliper shown in the drawing would set the points of compasses or dividers one hundred and five thousandths of an inch apart. It will be noted that two graduations in scale 13 on the hub are visible, each indicating twenty-five thousandths of an inch. To the fifty thousandths of an inch thus indicated must be added the five thousandths of an inch indicated by scale 15 on the sleeve, thus indicating that the face of the spindle and the face of the abutment are fifty-five thousandths of an inch apart. As the bottom of the depression and the bottom of the groove are each supposed in the present instance to be twenty-five thousandths of an inch from the face of the corresponding part, it follows that fifty thousandths added to the fifty-five thousandths indicated by the scale of the micrometer-calipers, making in all one hundred and five thousandths of an inch, will be the distance apart at which the points of compasses or dividers will be set by depression 16 and groove 17 at the adjustment of the micrometer-calipers shown in the drawing.

Having thus described my invention, I claim—

A measuring instrument comprising two members and means whereby one may be adjusted toward and from the other, one of said members having a depression in its side said depression being adapted to receive one point of compasses or dividers and to retain that point against lateral displacement, and the other member having a groove to receive the other point of the compasses or dividers.

In testimony whereof I affix my signature in presence of two witnesses.

GEORGE H. RADCLIFFE.

Witnesses:
    JAMES O'CONNOR,
    JOHN DUFFY.